United States Patent [19]

Miyamoto et al.

[11] 4,335,184

[45] Jun. 15, 1982

[54] RECORDING PAPER

[75] Inventors: Shigehiko Miyamoto, Kamagaya; Yoshinobu Watanabe, Matsudo, both of Japan

[73] Assignee: Mitsubishi Paper Mills, Ltd., Tokyo, Japan

[21] Appl. No.: 196,560

[22] Filed: Oct. 14, 1980

[30] Foreign Application Priority Data

Oct. 15, 1979 [JP] Japan ................................ 54-132542

[51] Int. Cl.³ ........................ B41M 5/00; G01D 15/34

[52] U.S. Cl. .................................... 428/342; 162/134; 162/135; 346/135.1; 400/126; 428/211; 428/330; 428/511; 428/537

[58] Field of Search .................. 162/134, 135, 181 R, 162/181 A; 346/135.1; 400/126; 428/537, 211, 340–342, 511, 323, 330, 668, 702

[56] References Cited

U.S. PATENT DOCUMENTS 4,269,891 5/1981 Minagawa ........................ 346/135.1

*Primary Examiner*—Bruce H. Hess

*Attorney, Agent, or Firm*—Cushman, Darby & Cushman

[57] ABSTRACT

A recording paper improved in image quality, comprising a base paper, the pH of its cold water extract being 5.0 to 10.0, and, disposed thereon, a coating layer containing a saponified-type petroleum resin sizing agent.

8 Claims, No Drawings

RECORDING PAPER

This invention relates to a recording paper suitable for use in the ink-jet recording process. More particularly, it relates to a recording paper improved in absorptivity of ink, staining caused by undried ink, and feathering of ink dots.

Recently, the ink-jet recording system has gained steady ground in view of recording speed, running cost, and freedom from the environmental nuisance. On the other hand, a wood-free paper or medium grade paper (a paper containing ground wood pulp in an amount of 30% or less) on the market used for the recording paper is unsatisfactory as a use for the ink-jet recording paper. The requirements for the paper material for use in the ink-jet recording are such that the ink droplets impinged on the paper surface should rapidly penetrate into the paper layer so that no staining of the paper surface will occur if the freshly printed image should be rubbed immediately after printing (hereinafter such a staining is referred to as smudging), and, in addition, the ink dots should be kept from spreading on the paper surface to prevent feathering of the image at the time of printing.

When the commercial wood-free paper or medium grade paper is coated, it is general that the paper, prior to the application of a coating composition, has been subjected to some degree of sizing treatment with a suitable sizing agent to avoid the deterioration of paper strength due to wetting and penetration by the coating composition, as well as to avoid migration of the coating. Accordingly, the coated paper is resistant to some extent against the ink absorption and feathering.

However, the recording characteristics of the paper naturally involve inconsistent relationships such as the relationships of ink absorptivity to feathering on the one hand and to smudging on the other hand. With the increase in ink absorptivity, the feathering becomes more increased, while if the ink absorptivity is reduced to control the feathering, an increase in smudging will be resulted. If ordinary wood-free paper or medium grade paper, which is not intended for specific use, is employed as the recording paper, the resolving power of the recorded image will be insufficient. For instance, in the case of polychromatic recording, droplets of different colors adhere in succession onto the same spot and if the earlier droplet is not entirely absorbed by the paper, the following droplet will land on a saturated area, resulting in ink-flow which deteriorates the image quality. If it is tried to solve such a difficulty by improving the ink absorptivity alone, only a limited solution will be achieved; an excessive increase in penetration of the ink will lead to another disadvantage of obscured image.

The present inventors found that such recording characteristics of the recording paper as ink absorptivity, feathering of ink dots and smudging of ink dots are largely dependent upon the sizing agent, fixing agent and filler incorporated in the recording paper. Subsequent extensive studies on the selection and application technique of the sizing agent have led to the present invention which provides a recording paper improved in image quality, comprising a base paper, the pH of its cold water extract being 5.0 to 10.0, preferably 6.5 to 9.0 and, disposed thereon, a coating layer containing a saponified-type petroleum resin sizing agent. There is used substantially fixing agent-free base paper. The pH of the cold water extract is the pH of the extract obtained by extracting the test specimen with cold water, as determined by the procedure specified in JIS P No. 8133.

The conventional coating materials for use in surface sizing of paper include gelatin, proteins, starch, starch derivatives, cellulose derivatives, and synthesized size materials such as polyvinyl alcohol, polyacrylamides, styrene-maleic acid copolymers, petroleum resin-based sizing agent, and cellulose-reactive type sizing agent. The petroleum resin sizing agents used in this invention are also well known. However, the primary object of this invention is achieved only by using a saponified-type petroleum resin as the surface sizing agent applied on a base paper which is unsized and free from a fixing agent. This type of petroleum resin was found to exhibit the ink receptivity characteristic of the present recording paper, which cannot be achieved by the emulsion-type petroleum resin sizing agents and all other known natural or synthetic sizing agents. In of this invention, a substantially unsized base paper which contains no fixing agent is used to exhibit most desirable image quality. The saponification value of the saponified-type petroleum resin can be adjusted so that a solubility in water and a viscosity suitable for the operation may be attained; a saponification value of 50 or above is generally suitable. The internal addition of a fixing agent such as aluminum sulfate decreases pH of the base paper and brings in an active aluminum ion which may react with the saponified-type petroleum resin, forming a hydrophobic petroleum resin which, in turn, not only decreases the ink receptivity but also causes, in some cases, discoloration and coagulation of an ink. There is used a base paper which is unsized and free from an fixing agent.

The exact reason for the superiority of the saponified-type of petroleum resin over the emulsion-type as the surface sizing agent for use in the present recording paper is yet to be elucidated. It seems, however, that as compared with the saponified-type petroleum resin sizing agent, the emulsion type sizing agent is more hydrophobic and gives a higher sizing degree even when used, for example, in sizing a base paper which is unsized and free from any fixing agent, thus resulting in decreased feathering of ink dots and, at the same time, decreased penetration of the ink into the paper layer, leading to increased smudging, whereas the saponified type sizing agent having both the hydrophobic and hydrophilic groups in an adequate proportion is able to suppress the feathering without interfering with the penetration of ink. In fact, the sizing effect of the saponified type sizing agent is discriminatingly different from that of the emulsion type sizing agent.

The saponified-type petroleum resin sizing agent is used in the present recording paper in an amount of 0.2 to 2.0% preferably in terms of solids based on the pulp. Although the upper limit is not unconditionally determinable, it is meaningless in view of the effect and economy to use an excessive amount. The use of too small an amount is ineffective in controlling the ink absorptivity of the unsized based paper. The above range of the amount to be used of the petroleum resin sizing agent is based on the base paper, 60 $g/m^2$ in basis weight, used in Example 1 (described later). The petroleum resin sizing agent is used at an application rate of from 0.10 to 1.04 $g/m^2$ in terms of solids, but can be used outside this range when the basis weight of paper is particularly large or small. Accordingly, it is a matter of course that the amount of petroleum resin sizing agent can suitably be adjusted to the outside of above range according to a use, basis weight, thickness or the like of the recording paper. The saponified-type petroleum resin sizing agent as herein referred to is a product generally obtained by introducing an $\alpha,\beta$-unsaturated carboxylic acid or anhydride into a polymerizate or modified polymerizate of $C_4$–$C_{11}$ fraction from naphtha cracking and saponifying the polar groups. These sizing agent are easily available as commercial products such as, for example, Coropal P-110SS ® (Seiko Kagaku Co.) and Homosize 900RS ® (Kindai Kagaku Co.).

The fillers and coating components which may be used together with the saponified-type petroleum resin sizing agent are as described below.

Fillers suitable for use in the present recording paper are clay, talc, ground limestone, precipitated calcium carbonate, silica, aluminum hydroxide, titanium oxide, and organic substances such as urea-formaldehyde resins. A base paper internally incorporated with 1 to 30, preferably 5 to 20% (based on pulp) of precipitated calcium carbonate or ground limestone is particularly suited as a base paper for use in preparing the present recording paper.

Other components for use in the surface coating composition are oxidized starch, modified starch, starch derivatives, polyvinyl alcohol, sodium alginate, carboxymethylcellulose, other water-soluble cellulose derivatives, casein and gelatin. These coating components may be used in combinations with calcium carbonate, colloidal silica, titanium oxide, and other pigments. Calcium carbonate is especially preferred in the case where the pH of cold water extract of the base paper is in the weakly acidic range. The application rate of calcium carbonate on the paper surface is from 0.2 to 30, preferably from 1 to 20 $g/m^2$ in terms of solids.

The coating composition containing the saponified-type of petroleum size is applied onto the base paper by means of a common size press, tub size, calender size, roll coater, air knife coater, or other types of coaters. The inclusion of a hydrophobic synthetic resin emulsion of high film-forming ability in the coating composition must be avoided lest the ink absorptivity should be hindered.

The recording paper thus prepared shows a low sizing degree as one of its paper characteristics and favorable improvement in ink absorptivity, feathering and smudging which affect the image quality.

The invention is illustrated below in detail with reference to Examples.

EXAMPLE 1

This Example shows the variation in image quality with varied size types.

To a slurry of pulp (LBKP: bleached kraft pulp from a hard wood) having a Canadian freeness of 380 ml, were added 15% by weight (based on pulp) of precipitated calcium carbonate and 0.5% by weight (based on pulp) of Cato 2 ® (a cationic derivative of starch; National Starch and Chemical Corp.) as a paper strength agent as well as a retention aid. The resulting paper stock was made into paper, 60 $g/m^2$ in basis weight, by means of a Fourdrinier pilot paper machine to obtain a base paper, the pH of its cold water extract having been 8.3. The coating compositions containing sizing agents of Nos. 1 to 5 shown in Table 1 were each applied onto the base paper at a rate of 0.26 $g/m^2$ of the sizing agent in terms of solids by means of a size press to obtain several types of recording paper. Further, the coating composition containing no sizing agent was applied onto the base paper by means of a size press to obtain the recording paper. Dot impression, 0.08 $mm^2$ in print area, was made on each test specimen of the recording paper. The results obtained were as shown in Table 1, wherein the degree of feathering was given in terms of ratio (in %) of the print area to the initial area (0.08 $mm^2$) of dots.

TABLE 1

| | Sizing agent | | Stoekigt sizing degree (sec.) | Degree of feathering (%) | Smudging |
|---|---|---|---|---|---|
| 1 | Example 1 | Saponified-type petroleum resin | 1.4 | 220 | No |
| 2 | Comparative Example | Styrene-maleic acid type | 1.9 | 160 | Appear |
| 3 | Comparative Example | Styrene-acryl type | 1.9 | 320 | Appear |
| 4 | Comparative Example | Acryl type | 0.5 | 600 | No |
| 5 | Comparative Example | Polyacrylamide | 0 | 1600 | No |
| 6 | Comparative Example | None | 0 | 2000 | No |

As is apparent from Table 1, a recording paper which is resistant to both feathering and smudging is only that of Example 1 wherein the petroleum resin sizing agent was used in accordance with this invention.

EXAMPLES 2 AND 3

The same base paper as used in Example 1 was coated with a composition comprising 8 parts of oxidized starch, 1 part of each petroleum resin sizing agent shown in Table 2, and 91 parts of water by means of a size press at an application rate of 3.6 $g/m^2$ in terms of total solids [corres. to 0.4 $g/m^2$ of the sizing agent (solid base)] to prepare various recording paper specimens. The results of tests performed as in Example 1 were as shown in Table 2.

TABLE 2

| | Petroleum resin sizing agent | Stoekigt sizing degree (sec.) | Degree of feathering (%) | Smudging |
|---|---|---|---|---|
| Example 2 | Saponified-type petroleum resin A | 1.8 | 180 | No |
| Example 3 | Saponified-type petroleum resin B | 3.0 | 176 | No |
| Comparative Example | Emulsion-type petroleum resin C | 17.2 | 160 | Appear |
| Comparative Example | Emulsion-type petroleum resin D | 12.9 | 180 | Appear |
| Comparative Example | Emulsion-type petroleum resin E | 8.2 | 190 | Appear |

Note:
A: Coropal P 110SS ® (Seiko Kagaku Co.)
B: Homosize 900SS ® (Kindai Kagaku Co.)
C: Homosize 900 (Kindai Kagaku Co.)
D: Pearl Gum E (Seiko Kagaku Co.)
E: Aporon N (Hamano Kogyo Co.)

As is apparent from Table 2, when a so-called emulsion-type petroleum resin sizing agent of low saponification degree composed of an unsaponified petroleum resin which was emulsified with a few percent of saponified rosin or saponified petroleum resin is used, the recording paper becomes useless because of a high sizing degree which results in increased smudging, whereas when the saponified type was used in accordance with this invention, favorable results were obtained, namely, no smudging was observed and the print of dots was confined to a minimum area.

EXAMPLE 4

A slurry of paper stock was prepared by blending 80% by weight of a pulp (LBKP) having a Canadian freeness of 350 ml and 20% by weight of a pulp (NBKP-bleached kraft pulp from soft wood tree) having a Canadian freeness of 450 ml and adding thereto 1% of cationic starch as paper strength agent. Paper was made from the above stock on the same paper machine as used in Example 1 to obtain a base paper of 60 $g/m^2$ basis weight, the cold water extract of which showed a pH of 5.5. For comparison, 3% of aluminum sulfate was added to the above stock and the resulting slurry (pH 4.2) was made into another base paper, the cold water extract of which showed a pH of 4.2.

A coating composition (21% solids content) comprising 10 parts of precipitated calcium carbonate, 10 parts of oxidized starch and 1 part of a saponified-type petroleum resin sizing agent (Coropal P 110SS®) was coated on the base papers at an application rate of each 9 $g/m^2$ in terms of solids. Using these coated papers as recording papers, tests were performed as in Example 1. The results obtained were as shown in Table 3.

TABLE 3

| | Base paper | Surface sizing agent | Stoekigt sizing degree (sec.) | Degree of feathering (%) | Smudging |
|---|---|---|---|---|---|
| Example 4 | Paper containing no aluminum sulfate | Saponified-type petroleum resin | 1.5 | 190 | No |
| Comparative Example | Acidic paper | Saponified-type petroleum resin | 21.0 | 155 | Appear |

As is seen from Table 3, when a coated paper is prepared from a base paper containing a fixing agent such as aluminum sulfate which decreases the pH of cold water extract to 5.0 or below, the resulting coated paper is unsuitable as ink-jet recording paper because of unacceptable smudging of ink dots, though the feathering is sufficiently reduced.

What is claimed is:

1. An ink-jet recording paper improved in image quality, comprising a base paper containing substantially no sizing agent and size-fixing agent, the pH of its cold water extract being 5.0 to 10.0, and, disposed thereon, a coating layer containing a saponified-type petroleum resin sizing agent obtained by introducing an $\alpha,\beta$-unsaturated carboxylic acid or anhydride into a polymerizate or modified polymerizate of $C_4$–$C_{11}$ fraction from naphtha cracking and saponifying the polar groups, the application rate of the coating layer being from 0.10 to 1.04 $g/m^2$ in terms of said saponified-type petroleum resin sizing agent.

2. An ink-jet recording paper according to claim 1, wherein the pH of cold water extract of a base paper is 6.5 to 9.0.

3. An ink-jet recording paper according to claim 1, wherein the base paper contains calcium carbonate incorporated therein as a filler.

4. An ink-jet recording paper according to claim 3, wherein the base paper contains 1 to 30% by weight based on pulp of calcium carbonate.

5. An ink-jet recording paper according to claim 4, wherein the base paper contains 5 to 20% by weight based on pulp of calcium carbonate.

6. An ink-jet recording paper according to claim 1, wherein the coating layer contains calcium carbonate.

7. An ink-jet recording paper according to claim 9, wherein the calcium carbonate content of the coating layer is 0.2 to 30 $g/m^2$.

8. An ink-jet recording paper according to claim 1, wherein the saponification value in the saponification of polar groups is 50 or above.

* * * * *